(12) United States Patent
Muramatsu et al.

(10) Patent No.: US 6,229,609 B1
(45) Date of Patent: May 8, 2001

(54) SCANNING NEAR-FIELD OPTIC/ATOMIC FORCE MICROSCOPE

(75) Inventors: Hiroshi Muramatsu; Tatsuaki Ataka, both of Tokyo; Masamichi Fujihira, Yokohama; Norio Chiba, Tokyo, all of (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 08/225,756

(22) Filed: Apr. 11, 1994

(30) Foreign Application Priority Data

| | | |
|---|---|---|
| Apr. 12, 1993 | (JP) | 5-084952 |
| Nov. 5, 1993 | (JP) | 5-276704 |
| Nov. 5, 1993 | (JP) | 5-276706 |
| Mar. 23, 1994 | (JP) | 6-052248 |

(51) Int. Cl.⁷ .................................. G01B 11/24
(52) U.S. Cl. ........................ 356/376; 250/234; 250/306
(58) Field of Search .................... 356/376, 371, 356/73; 250/309, 310, 311, 234

(56) References Cited

U.S. PATENT DOCUMENTS

| | | | | |
|---|---|---|---|---|
| 4,645,917 | * | 2/1987 | Penney et al. | 356/376 |
| 4,850,712 | * | 7/1989 | Abshire | 356/376 |
| 5,018,865 | * | 5/1991 | Ferrell et al. | 356/376 |
| 5,144,833 | * | 9/1992 | Amer et al. | 356/376 |
| 5,150,392 | * | 9/1992 | Hohn et al. | 250/309 |
| 5,210,410 | * | 5/1993 | Barrett | 250/234 |
| 5,254,854 | * | 10/1993 | Betzig | 250/234 |
| 5,304,795 | * | 4/1994 | Fujihira et al. | 250/234 |
| 5,354,985 | * | 10/1994 | Quate | 250/234 |

FOREIGN PATENT DOCUMENTS

| | | | |
|---|---|---|---|
| 535611A1 | * | 4/1993 | (EP) . |
| 0535611 | | 4/1993 | (EP) . |
| 0487233 | | 5/1993 | (EP) . |
| 0545538 | | 6/1993 | (EP) . |
| 545538A1 | * | 6/1993 | (EP) . |

OTHER PUBLICATIONS

Review of Scientific Instruments, vol. 63, No. 9, New York, USA, Sep. 1992, pp. 4061–4065, Shmuel Shalom et al., "A Micropipette Force Probe Suitable for Near–field Scanning Optical Microscopy".*

Analytical Chemistry, vol. 63, No. 11, Washington, D.C., USA, Jun. 1991, pp. 625A–638A, Aaron Lewis et al., "The Optical Near Field and Analytical Chemistry".*

Japanese Journal of Applied Physics, Part 2, Sep. 1, 1992, vol. 31, No. 9A, pp. L1302–L1304, T. Pangaribuan et al., "Reproducible Fabrication Technique of Nanometric Tip Diameter Fiber Probe for Photon Scanning Tunneling Microscope".

(List continued on next page.)

Primary Examiner—Hoa Q. Pham
(74) Attorney, Agent, or Firm—Adams & Wilks

(57) ABSTRACT

An apparatus capable of measuring the topography and the optical characteristics of the surface of a sample at high resolution irrespective of the transmittance and the conductivity of the sample is realized. The apparatus comprises a probe, a light source for illuminating a sample with light, a photoelectric converter device and optics for receiving light transmitted through the sample or light reflected by the sample, a laser emitting laser light for detecting deflections of the probe, a condenser lens for directing the laser light to the rear surface of the probe, a detection system for detecting reflected light, a rough-motion mechanism and a fine-motion mechanism for moving the sample and the probe relative to each other, a control means for controlling the distance between the sample and the probe, and a computer for controlling the whole apparatus. The probe has a front end portion and a light-propagating body continuous with the front end portion. The front end portion and the light-propagating body are shaped like a hook. The apparatus observes the topography and the optical characteristics of the surface of the sample.

18 Claims, 12 Drawing Sheets

OTHER PUBLICATIONS

Applied Physics Letters, Feb. 1, 1993, U.S.A., vol. 62, No. 5, pp. 461–463, N.F. van Hulst et al., "Near–field optical microscope using a silicon–nitride probe".

Applied Physics Letters, Jun. 15, 1992, U.S.A., vol. 60, No. 24, pp. 2957–2959, R. Toledo–Crow et al., "Near–field differential scanning optical microscope with atomic force regulation".

Review of Scientific Instruments, Sep. 1992, U.S.A., vol.63, No.9, pp.4061–4065, S.Shalom, "A micropipette force probe suitable for near–field scanning optical microscopy".

Analytical Chemistry, Jun. 1991, U.S.A., vol.63, No.11, pp.625A–638A, A. Lewis et al., "The Optical Field and Analytical Chemistry".

* cited by examiner

SCANNING NEAR-FIELD OPTIC/ATOMIC FORCE MICROSCOPE

BACKGROUND OF THE INVENTION

The present invention relates to a scanning near-field optic/atomic force microscope for observing the topography of a substance to be investigated, by making use of an atomic force acting between substances, and at the same time for observing the optical property of a microscopic region of the investigated substance by a probe consisting of a light-propagating body.

Atomic force microscopes (AFMs) are capable of accurately observing the topography of the surface of a sample, irrespective of whether the sample is conductive or not, in contrast to scanning tunneling microscopes (STMs) and, therefore, AFMs are in widespread use. Atomic force microscopy is a measuring method utilizing the fact that a spring element supporting a measuring probe is deflected by an atomic force acting between a sample and the measuring probe.

In an attempt to measure the optical characteristics and the topography of a sample, a probe consisting of a light transmissive medium having a sharp front end was brought close to the sample to be investigated such that the distance between them was less than the wavelength of light. Also, some close-field optical microscopes have been proposed. In one of these proposed optical microscopes, laser light is directed from the rear side of a sample such that the light is totally reflected by the rear surface of the sample. Evanescent light leaking from the front surface of the sample is detected by bringing the front end of an optical fiber probe close to the surface of the sample, the probe being equipped with a fine-motion mechanism. The topography of the surface is observed in the way that the probe is scanning horizontally and vertically so as to detect constant evanescent light, or the probe is scanning horizontally so as to measure variations in the intensity of the evanescent light.

In another proposed apparatus, the front end of an optical fiber probe is held vertical to a sample. The front end is vibrated horizontally over the surface of the sample to produce friction between the sample surface and the front end of the probe, thus resulting in vibrations. Variations in the amplitude of the vibrations are detected as deviations of the optical axis of laser light which is emitted from the front end of the optical fiber and transmitted through the sample. A fine-motion mechanism is actuated to move the sample so that the distance between the front end of the probe and the sample surface is maintained constant. The surface topography is detected from the intensity of the signal applied to the fine-motion mechanism. Also, the transmissivity of the sample for the light is measured.

In a further proposed apparatus, a glass capillary having a hook-shaped front end portion is used. A fluorescent material is loaded into the tip portion of the capillary. A reflecting sheet for optically detecting deflections of the probe is installed on the rear side of the capillary, i.e., on the opposite side of the front end of the hook-shaped portion. Light is emitted from the back side of the sample and transmitted through the sample. This causes the fluorescent material at the front end of the probe close to the sample to emit light, which is transmitted through the sample. This light is detected on the rear side of the sample. In this way, the sample is investigated by atomic force microscopy. At the same time, the transmissivity is measured.

A still other proposed apparatus uses a probe consisting of an electrically conductive and light transmissive medium as an STM probe so as to measures the optical characteristics of the sample simultaneously.

The prior art AFM and STM techniques are adapted for observation of surface topography but are incapable of measuring the physical and chemical natures of a sample. A method of using light as a means for observing these properties of a sample is contemplated.

Some apparatuses of close-field optical microscopes use evanescent light. In such an apparatus, light intensity is used as information regarding the direction of height. Therefore, it is impossible to separate variations in the light intensity in the direction of height from light intensity variations due to absorption of light into a sample. Hence, it is difficult to use this apparatus as a means for measuring the physical and chemical properties of a sample. Where the sample surface is greatly uneven, light may not be totally reflected by the rear surface of the sample but be transmitted through it. Transmitted light rays may interfere with each other on the surface of the sample, thus hindering measurements.

In the case of an apparatus where a probe is vibrated horizontally, it is necessary that the sample be a substance which transmits light. In addition, the front end of the probe vibrates horizontally. Therefore, where the sample surface is greatly uneven, limitations are imposed on improvements of the horizontal resolution.

In the case of an apparatus using a capillary, it is necessary that the sample transmit light. Also, the measurable wavelength of the light may be restricted by the used fluorescent material.

Where the apparatus is combined with an STM, measurable samples are limited to electrically conductive ones.

SUMMARY OF THE INVENTION

It is an object of the present invention to provide a scanning near-field optic/atomic force microscope capable of measuring the topography and the optical characteristics of the surface of a sample at high resolution, irrespective of whether the sample transmits light or whether the sample is electrically conductive.

It is another object of the invention to provide a probe for use with a scanning near-field optic/atomic force microscope, which is easy to manufacture, and excellent in shape reproducibility, as well as a method of fabricating such a probe.

The above objects are achieved in accordance with the teachings of the invention by a probe for use with a scanning near-field optic/atomic force microscope, the probe comprising a light-propagating medium having an end portion provided with a hole that passes light. The probe has a light-passing hole portion which forms a sharp front end portion. This front end portion is made continuous with a light-propagating body to form a hook-shaped portion. The probe is further provided with a light-reflecting portion for optically detecting deflections of the probe. The light-reflecting portion consists either of a light-reflecting surface formed on the probe itself or of a minute light reflector fixed to a part of the probe.

In addition, a probe-holding body having a position-aligning surface is installed on the hook-shaped portion of the probe on the opposite side of the front end portion.

The above-described probe for a scanning near-field optic/atomic force microscope is fabricated by installing the probe-holding body, sharpening the front end portion, forming the hook-shaped portion, and forming the light-reflecting surface or installing the light reflector.

The method includes bonding the light reflector to the probe by emitting high-power laser light simultaneously with formation of the hook-shaped portion.

This probe has a portion coated with a reflecting film for reflecting light, the film being formed around a sharp light-passing hole portion. The coated portion, excluding the hole, extends at least up to the hook-shaped portion.

A spring element having a light-reflecting means on a part thereof has a front end portion which is bonded to the probe having the hook-shaped portion. In this probe for an AFM, the support points of the probe are more remote from the front end than the support points of the spring element.

The probe is further equipped with an auxiliary probe disposed close to the sharp front end portion of the probe. The auxiliary probe consists of a light-propagating body having an end portion provided with a hole for passing light. The auxiliary probe comprises a light-passing hole portion and a light-transmitting surface which is disposed close to the front end portion of the probe, the light-passing hole portion consisting of a flat or convex surface. This auxiliary probe receives either light which is scattered by the surface of a sample after being emitted from the sharpened probe or fluorescent light emitted from the surface of the sample. Alternatively, the auxiliary probe emits light to the observed sample surface at the front end of the sharpened probe, and scattered light or fluorescent light from the sample surface is detected by the sharpened probe.

A scanning near-field optic/atomic force microscope adapted to observe the topography and the optical characteristics of the surface of a sample comprises the above-described two probes, a light source and optics for irradiating the sample with light, a photoelectric converter device and optics for receiving light transmitted through the sample or light reflected from the sample, a laser for emitting laser light for detecting deflections of the sharpened probe, a condenser lens for directing the laser light to the rear surface of the sharpened probe, a detection system for detecting reflected light, a coarse-motion mechanism and a fine-motion mechanism for making a relative movement between the sample and the sharpened probe, a control means for controlling the distance between the sample and the sharpened probe, and a computer for controlling the whole apparatus.

Also, the present invention provides a scanning near-field optic/atomic force microscope adapted to observe topography and optical characteristics of a surface of a sample comprises the above-described two probes, a light source and optics for irradiating the sample with light, a photoelectric converter device and optics for receiving light transmitted through the sample or light reflected by the sample, a mechanism for vibrating the sharpened probe vertically between the front end and the sample, a laser for producing laser light for detecting deflections of said sharpened probe, a condenser lens for directing said laser light to the rear surface of the sharpened probe, a detecting system for detecting reflected light, a coarse-motion mechanism and a fine-motion mechanism for making a relative movement between said sample and the sharpened probe, a control means for controlling the distance between the sample and the sharpened probe, and a computer for controlling the whole apparatus.

The inventive scanning near-field optic/atomic force microscope uses a probe consisting of a light-propagating body as an ordinary probe for an AFM, the probe having a hook-shaped front end portion. A reflecting sheet is attached to the rear surface of the hook-shaped portion and is used to detect the degree of transformation of an atomic force into a displacement as a deviation of the position of the reflected light, by making use of the resilience of the light-propagating body. The atomic force acts between the sample surface and the front end of the probe.

The support points of the light-propagating body are spaced from the support points of the spring element and thus the probe whose spring element is bonded to the rear side of the hook-shaped portion suppresses the effects of the rigidity of the light-propagating body. A displacement depending on the resilience of the spring element can be obtained. Therefore, it is easy to set the resilience.

When the probe having the probe-holding body installed thereon is installed on a scanning near-field optic/atomic force microscope, a structure that supports the probe-holding body can be readily realized. It is easy to mount and detach the probe. With a scanning near-field optic/atomic force microscope equipped with the probe on which the probe-holding body is installed, the distance to the front end of the probe, the angle through which the hook-shaped portion is bent, and the angle of the light-reflecting surface can be easily adjusted.

In the above-described method of fabricating a scanning near-field optic/atomic force microscope, the probe-holding body which is once held to the probe is neither detached nor moved in any of the steps of separating and sharpening the probe, shaping a hook-shaped form, and forming a light-reflecting surface or installing the light-reflecting surface. The probe-holding body is mounted to a working machine in each step, by utilizing the alignment surface of the probe-holding body. This can improve the accuracy of the length between the probe-holding body and the hook-shaped portion and the accuracy of the angle of the light-reflecting surface relative to the hook-shaped portion. Furthermore, the reproducibility of these accuracies can be enhanced. Also, it is easier to treat than the minute light-propagating body itself.

The step of bonding the light reflector to the probe is carried out by irradiating high-power laser light simultaneously with formation of the hook-shaped portion. This can reduce the number of manufacturing steps.

Where light is detected on the sharpened probe, the reflecting film that covers the sharpened probe except for the opening at the front end acts to avoid the effects of unwanted scattering light incident on the sharpened probe from other than the measured portion. Where the sharpened probe irradiates the sample with light, the reflecting film serves to focus the spot of the light on the sample surface.

The auxiliary probe installed near the sharpened probe is used to irradiate the sample surface with light or to detect scattering light or fluorescent light from the sample surface. Two methods are available. In one method, light is introduced into the sharpened probe. The light is directed from the front end of the sharpened probe to the sample. The light reflected by the sample surface is measured by the auxiliary probe. In the other method, light is directly directed to the surface of the sample from the auxiliary probe. Scattering light or fluorescent light is detected at the front end of the sharpened probe. Thus, light is emitted or detected, using the auxiliary probe. The position at which light is emitted or received can be established with greater ease than the case in which lenses and optics are used. Moreover, measurements can be made in such a way that only small space is required to be secured on the sample.

When the probe is scanned horizontally, the means for making vertical vibration between the front end of the probe and the sample prevents the sample surface and the front end of the sharpened probe from being damaged by horizontal stress produced between the sample and the front end of the probe because of the contact between them due to unevenness of the sample.

DETAILED DESCRIPTION OF THE PREFERRED EMBODIMENTS

Embodiments of a scanning near-field optic/atomic force microscope according to the invention are hereinafter described with reference to the drawings.
(Structure of Probe)

Figure 1:
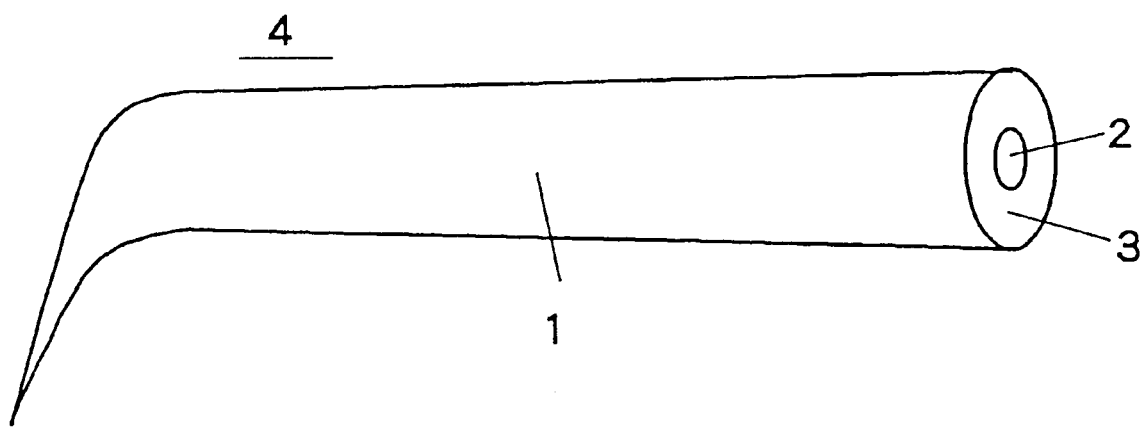
FIG. 1 is a schematic view of a sharpened probe according to the invention.

FIG. 1 is a schematic view of a sharpened probe according to the invention, the probe being built using an optical fiber. In FIG. 1, the optical fiber 1 which is a light-propagating body comprises a core 2 for propagating light and a cladding 3 having a different refractive index from that of the core. The optical fiber 1 has a sharpened front end portion which is shaped into a hook. The sequence in which this probe is fabricated is now described.

An optical fiber having a core diameter of 10 $\mu$m and a cladding diameter of 125 $\mu$m was used as a sharpened probe 4. The coating of synthetic resin was removed about 2 to 6 cm from the front end of the optical fiber 1. The exposed central portion was drawn out to opposite sides while heating the central portion until the fiber severed at the central portion. For the heating described above, a platinum wire was wound into a coil. The optical fiber was passed through the center of the coil. Electric current was passed through the platinum wire so that it got hot. In this way, the optical fiber was heated. It could also be fabricated by focusing light from a carbon dioxide gas laser onto the exposed central portion of the optical fiber and drawing out the central portion to opposite sides. In either method, the diameter of the front end can be made less than 0.1 $\mu$m, which was small enough to be used in measurements.

In the case of an optical fiber of the single-mode type used in the illustrated embodiment, the core diameter is about one tenth of the cladding diameter. Therefore, the portion transmitting light is about 0.01 $\mu$m in the front end portion. The front end portion could be further sharpened by etching. For this etching process, mixed liquid containing hydrofluoric acid and ammonium fluoride at a rate of 1:3 was used. The front end was dipped in this liquid for 5 to 90 minutes. Light emitted by a carbon dioxide gas laser was focused to irradiate onto a portion of the optical fiber fabricated in this way, the portion being spaced 0.1 to 3 mm from the front end of the fiber. Let 0° be the angular position assumed before deformation. The deformation produced a hook-shaped portion of about 60 to 90°. In this case, the irradiated side absorbed more heat than did the rear side, causing the irradiated side to soften. This created surface tension on the glass. As a result, the front end of the optical fiber was bent toward the irradiated side. The angle was adjusted by controlling the laser output while monitoring the degree of the bending. If the user wears protective goggles, the front end can be observed with the naked eye but a safer and more reliable method consists of installing a video camera on the microscope and observing the front end with a video monitor.

Figure 2:
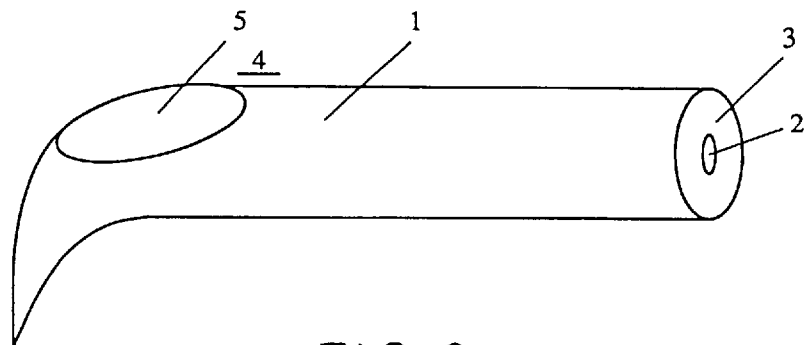
FIG. 2 is a schematic view of a sharpened probe according to the invention, the probe having a light-reflecting surface.

FIG. 2 shows a structure fabricated by forming a light-reflecting surface 5 by mechanical polishing on the hook-shaped portion of the sharpened probe 4. The light-reflecting surface 5 is coated with a reflective metal film of gold, aluminum, chromium, nickel, or the like.

Figure 3:
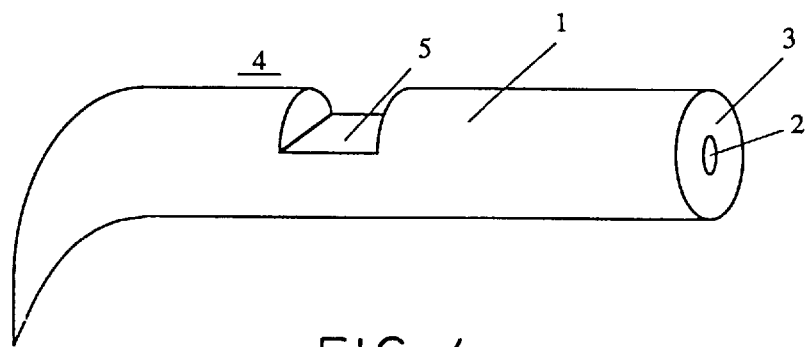
FIG. 3 is a schematic view of a sharpened probe according to the invention, the probe having another light-reflecting surface.

FIG. 3 shows a structure obtained by forming a light-reflecting surface 5 by mechanical polishing on the hook-shaped portion of the sharpened probe 5 on the opposite side of the front end. This structure differs from the embodiment shown in FIG. 2 in the position at which the light-reflecting surface 5 is formed.

Figure 4:
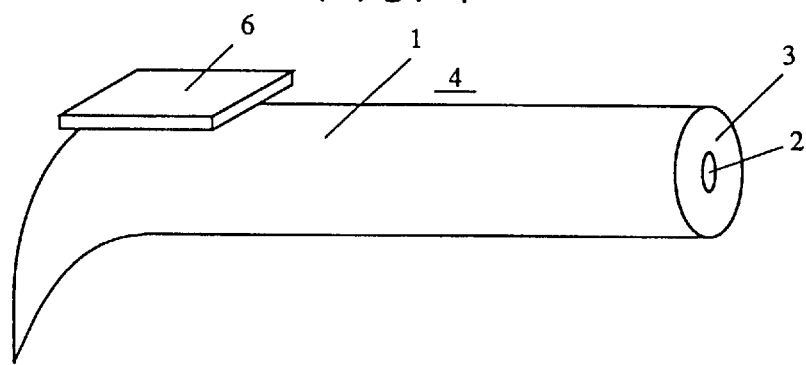
FIG. 4 is a schematic view of a sharpened probe according to the invention, the probe having a light-reflecting sheet.

FIG. 4 shows a structure in which a light reflector 6 is installed on the rear side as viewed from the front end of the sharpened probe 4. The light reflector 6 can consist of (i) a stainless steel sheet, an aluminum sheet, or other metal sheet, (ii) a metal sheet coated with a thin gold film to improve the reflectivity, or (iii) a glass substrate, a silicon substrate, or the like coated with a reflective metal film. One method of holding the light reflector 6 to the sharpened probe 4 is to use a vinylic adhesive having a curing time of about 10 minutes and exhibiting tackiness before being cured. Where the light reflector is fabricated by coating a glass substrate with a high-melt metal film such as molybdenum or titanium, a melting-and-bonding step using laser light as described later can be employed.

In the case of the sharpened probe 4 described above, the resilience of the light-propagating body itself is used as a spring element without using a separate spring element. This can simplify the structure. Hence, variations in the characteristics due to variations in the state in which the probe is mounted to another spring element can be reduced. Furthermore, the structure is easy to fabricate. In addition, various characteristics including the resonance frequency and the Q-value can be made homogeneous.

Probes fabricated in practice had resonance frequencies of 2 kHz to 20 kHz and Q-values of 100 to 500. They were excellent in reproducibility.

Figure 5:
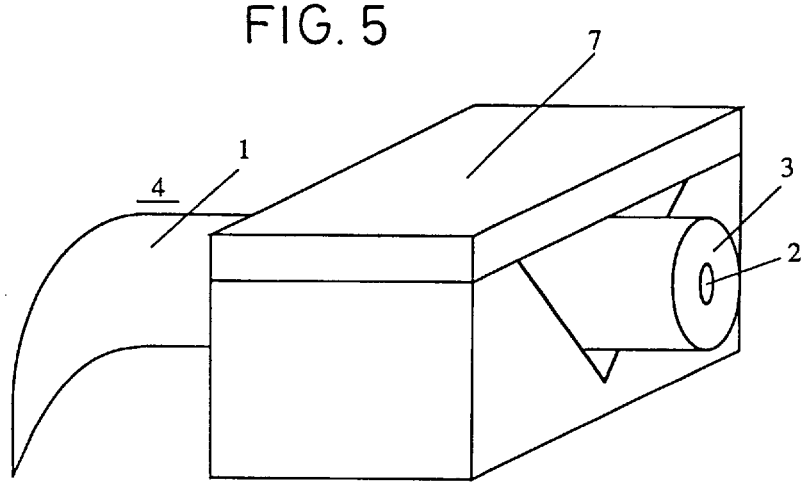
FIG. 5 is a schematic view of a sharpened probe according to the invention, the probe having a probe-holding body.

FIG. 5 shows a structure in which a probe-holding body 7 having a position-aligning surface is installed on the hook-shaped portion of the sharpened probe 4 on the opposite side of the front end portion. For example, the probe-holding body 7 comprises a support member in the form of a rectangular parallelepiped and a holding plate, the support member being provided with a V-groove conforming to the diameter of the optical fiber. Also, the structure can be fabricated by preparing a part in the form of a rectangular parallelepiped, forming a hole extending through the part such that the hole conforms to the diameter of the optical fiber, inserting the fiber 1 through the hole, and adhesively bonding the fiber to the part. If the probe-holding body 7 has a bottom surface and an end surface, then a shape other than a rectangular parallelepiped or a shape having a jaw for mounting may also be used. The probe-holding body 7 can be installed directly on the optical fiber 1 or on the synthetic resin coating (not shown) of the fiber 1.

A probe for a scanning near-field optic/atomic force microscope is easily damaged or soiled in use and so it is necessary that the probe can be readily replaced. When the above-described probe is installed on a scanning near-field optic/atomic force microscope, a structure for holding the probe-holding body 7 can be easily realized. It is easy to mount and detach the probe.

FIGS. 6–9 show methods of fabricating a sharpened probe for a scanning near-field optic/atomic force microscope in accordance with the present invention.

Figure 6:
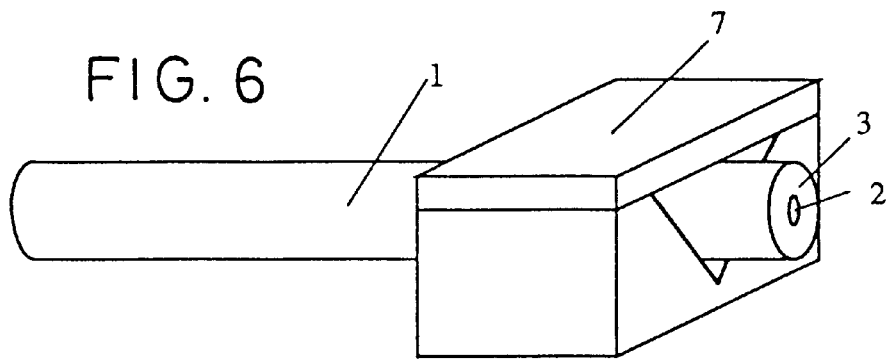
FIGS. 6–9 are views illustrating steps for manufacturing a sharpened probe according to the invention, the probe having a light-reflecting surface and a probe-holding body.

Referring to FIG. 6, the coating of a synthetic resin is removed about 2 to 10 cm from the end of the fiber 1. The probe-holding body 7 is installed on a portion which covers about 0.5 to 6 cm from the end of the fiber 1. For example, the optical fiber 1 is installed on a support member provided with a V-groove conforming to the diameter of the fiber. The fiber is held down by a holding plate to form the probe-holding body 7. Also, the method can be effected by forming a hole extending through a part in the form of a rectangular parallelepiped such that the diameter of the hole agrees with the diameter of the fiber, passing the fiber 1 through the part, and adhesively bonding them together.

Figure 7:
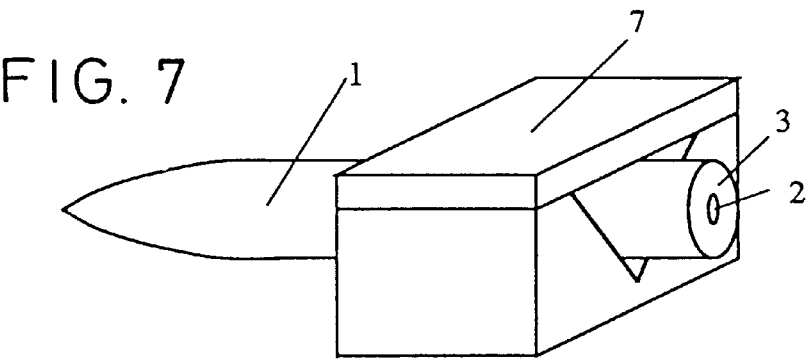

In FIG. 7, both ends of an optical fiber 1 are drawn out while heating it until it severs. In this way, the fiber is sharpened. For this heating, a platinum wire is wound into a coil, the optical fiber is passed through the center of the coil, and electric current is passed through the platinum wire so that it gets hot, in the same way as the foregoing. It can also be fabricated by focusing light from a carbon dioxide gas laser to irradiate onto the exposed central portion of the optical fiber and drawing out the opposite ends of the central portion.

Figure 8:
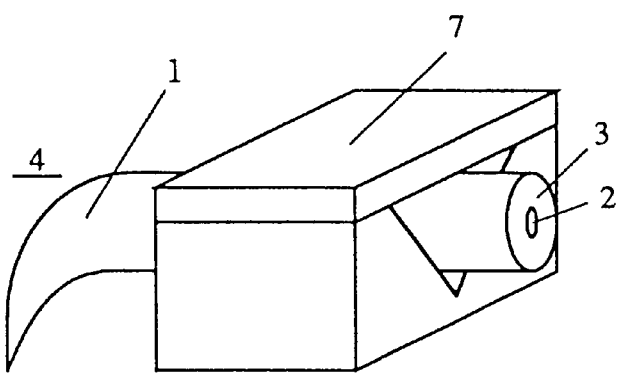

In FIG. 8, light emitted by a carbon dioxide gas laser is focused to irradiate onto a portion of the optical fiber fabricated from a sharpened probe, the portion being spaced 0.1 to 1.5 mm from the front end of the probe. Let 0° be the angular position assumed before deformation. The deformation produces a hook-shaped portion of about 60 to 90°. The bottom surface of the probe-holding body 7 is placed at right angles to the laser light. The distance between the laser light and the end surface of the probe-holding body 7 is maintained constant. In this case, the irradiated side absorbs more heat than does the rear side, causing the irradiated side to soften. This creates surface tension on the glass. As a result, the front end of the optical fiber is bent toward the irradiated side. The distance between the end surface of the probe-holding body 7 and the hook-shaped portion can be kept constant and the direction of bending can be made at right angles to the bottom surface of the probe-holding body 7 by this step.

Figure 9:
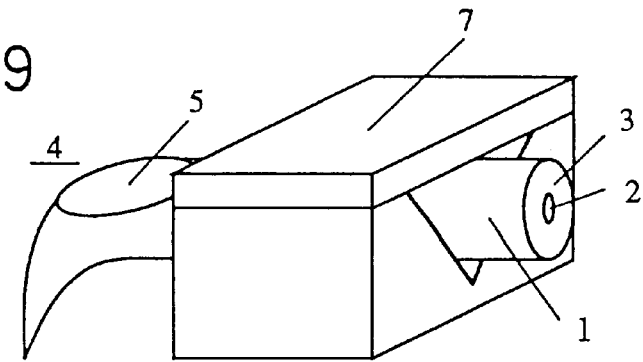

In FIG. 9, the hook-shaped portion of the probe is mechanically polished while placing the bottom of the end surface of the probe-holding body 7 parallel to the polished surface to form a light-reflecting surface 5. This surface 5 can be made at right angles to the direction of bending of the probe as viewed from the hook-shaped portion. Only the cladding is polished to prevent the core of the optical fiber from being exposed. The amount of polishing is so set that about one third of the probe diameter is polished.

Furthermore, the probe excluding the opening at the front end and the light-reflecting surface 5 are simultaneously coated with a metal film of nickel, chromium, gold, or other metal. Where light is introduced into the probe, the formed reflecting film removes light noise coming from the sides. Where light is emitted from the probe, the reflective film enhances the directivity of the illuminating light. The method of coating a metal film can be sputtering, evaporation, electroless plating, or other method. In this case, even the opening is coated with the reflective film. To remove the coating over the opening, etching using a strong acid can be utilized. Alternatively, during operation of the AFM, the contact pressure is increased to mechanically remove the coating.

In the above-described method of fabricating the sharpened probe for a scanning near-field optic/atomic force microscope, the accuracy of the length between the probe-holding body 7 and the hook-shaped portion, the accuracy of the direction of bending of the hook-shaped portion, and the accuracy of the angle made between the hook-shaped portion and the light-reflecting surface can be enhanced. Furthermore, the reproducibility of these accuracies can be improved. In addition, the probe-holding body 7 can be treated with greater ease than the minute optical fiber itself. Consequently, the characteristics can be made uniform.

In the present embodiment, the probe is sharpened after the probe-holding body 7 is installed. Similar operation and utility may be obtained by installing the probe-holding body 7 after sharpening the probe.

Figure 10:
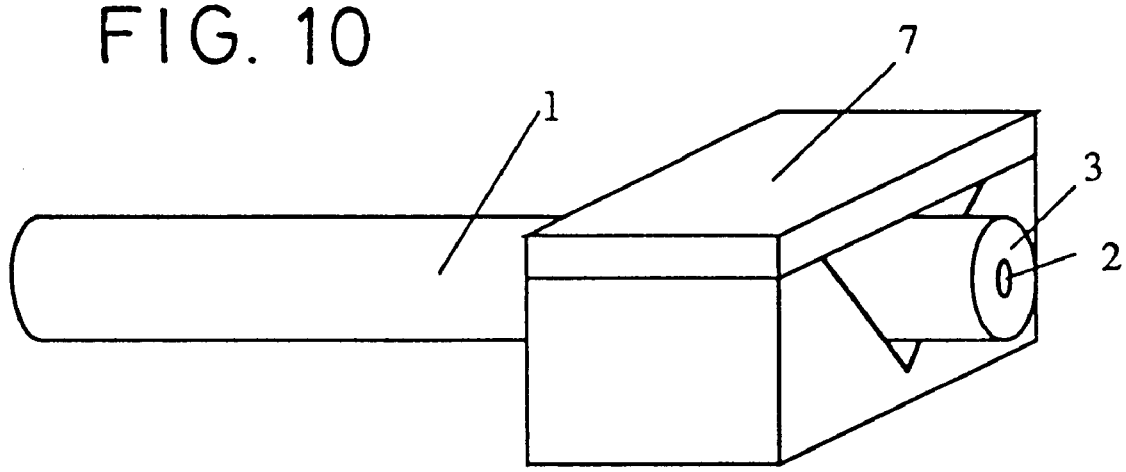
FIGS. 10–12 are views illustrating steps for manufacturing a sharpened probe according to the invention, the probe having a light-reflecting sheet and a probe-holding body.
Figure 11:
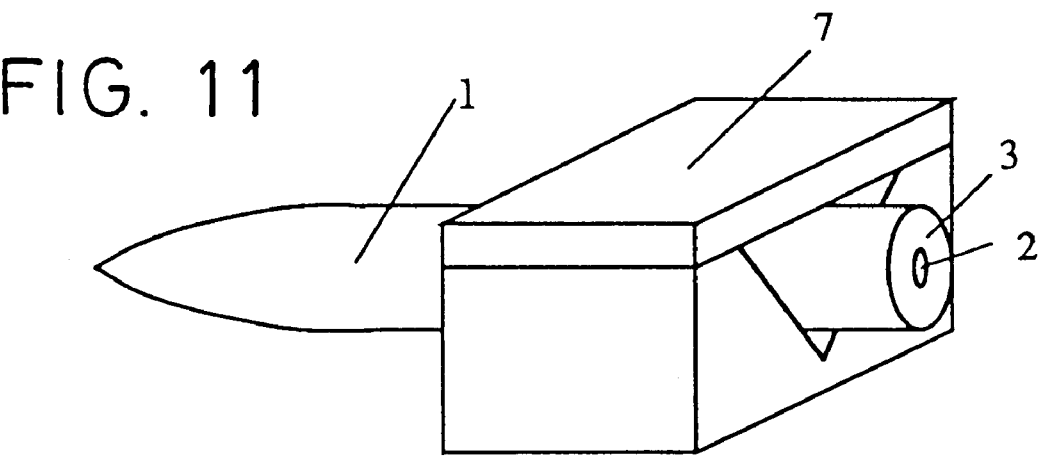
Figure 12:
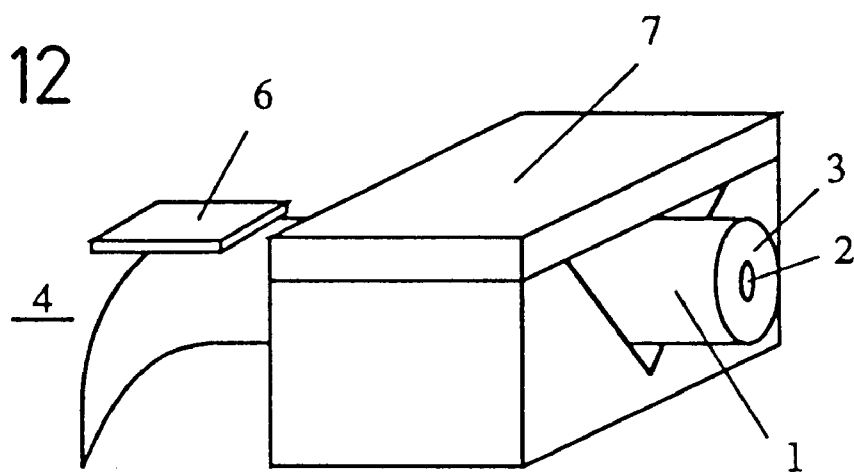

FIGS. 10–12 show other examples of method of fabricating a sharpened probe for a scanning near-field optic/atomic force microscope according to the invention.

FIGS. 10 and 11 illustrate a step of installing a probe-holding body 7 and then sharpening an optical fiber 1. This step is similar to the step illustrated in connection with FIGS. 6 and 7.

In FIG. 12, a light reflector 6 is formed by a glass substrate having a thickness of about 10 to 100 $\mu$m coated with a high-melt metal film such as molybdenum. This reflector 6 is spaced 0.1 to 1.5 mm from the front end of a sharpened probe 4 and brought into contact with the probe 4 in parallel with the bottom surface of a probe-holding body 7. Light emitted from a carbon dioxide gas laser is focused to irradiate onto it to form a hook-shaped portion. At the same time, the light reflector 6 is adhesively bonded by irradiated laser light. The bottom surface of the probe-holding body 7 is positioned at right angles to the laser light. The distance between the laser light and the end surface of the probe-holding body 7 is maintained constant. Heat produced by the laser light causes the probe to bend as already described in conjunction with FIG. 8. Simultaneously, the glass portion of the light reflector 6 is melted and bonded to the probe. The distance between the end surface of the probe-holding body 7 and the hook-shaped portion can be kept constant and the direction of bending can be made at right angles to the bottom surface of the probe-holding body 7 by this step. The light reflector 6 can be made at right angles to the direction of bending of the probe as viewed from the hook-shaped portion.

Figure 13:
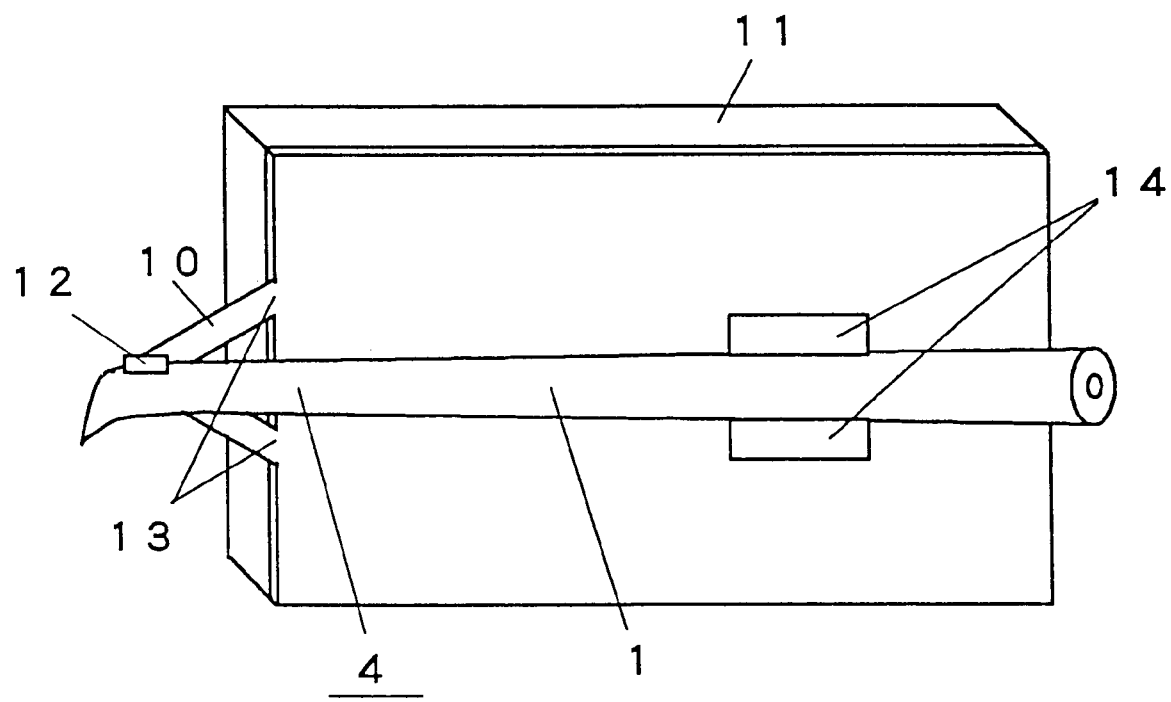
FIG. 13 is a schematic view of a sharpened probe according to the invention, the probe being used together with a spring element.

FIG. 13 is a schematic view of a probe using a spring element that is separate from an optical fiber. A spring element 10 having a light-reflecting means and a front end portion 12 is joined to the rear side of a sharpened probe 4 as viewed from the front end of the hook-shaped sharpened probe 4. The spring element 10 is joined at its support points 13 to a support member 11. The sharpened probe 4 is joined to the support member 11 at its support points 14 which are farther from the front end than the support points 13.

In the illustrated example, V-shaped stainless steel sheets having a thickness of 10 $\mu$m are used as a spring element. The angle is 60°. The width of each sheet is 0.2 mm. The length from the support points 13 to the front end is 1.5 mm. A sharpened probe 4 has the support points 14 which are spaced about 10 mm from the front end. The surfaces of the stainless steel sheets which are opposite to the surfaces bonded to an optical fiber are smooth enough to reflect light. A brazing metal having a melting point of 50° C. is used to braze the stainless steel sheets to the probe and to braze the support member to the probe. The use of the brazing metal makes it easy to mount and detach the probe by heat. Hence, the probe can be easily replaced. In this case, the observed resonant point is in the neighborhood of 7 kHz.

Since the resilience of this type of probe mainly depends on the shape of the spring element 10, a spring characteristic can be obtained with high reproducibility. Also, the spring characteristic can be varied at will by changing the material and the shape of the spring element. Another merit is that the angle of the reflecting sheet is not required to be adjusted. Also, it is possible to use the spring element 10 only as a reflecting sheet. In this case, the probe can be used even if the support points 13 and 14 are close to each other.

Figure 14:
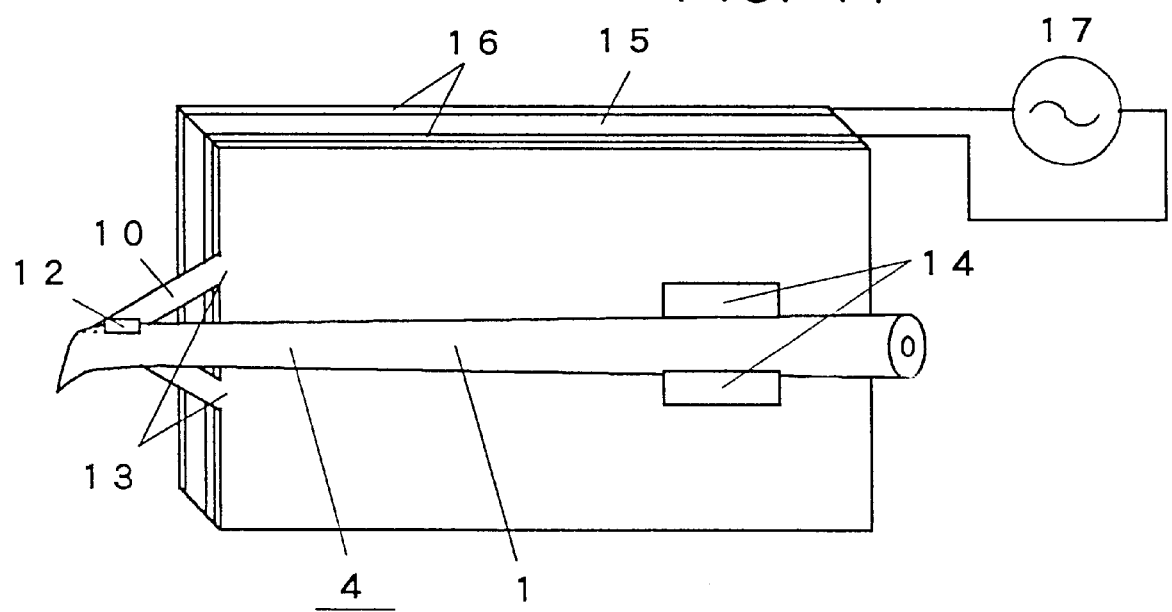
FIG. 14 is a schematic view showing the structure of a sharpened probe and a probe-vibrating piezoelectric device according to the invention.

FIG. 14 is a schematic view of a probe using a piezo-electric device as a means for producing vertical vibrations between a probe and a sample. This device causes the probe to vibrate vertically relative to the sample. A piezoelectric body 15 expands and contracts in the direction of the thickness when a voltage is applied. Electrodes 16 are mounted to both surfaces of the piezoelectric body 15. An AC power supply 17 capable of applying an AC voltage of 0.1 to 10 V at 1 to 100 kHz is connected between the electrodes. The piezo-electric body 15 is disposed in the same way as the support member 11 for the probe shown in FIG. 13. A sharpened probe 4 and a spring element 10 are coupled together.

The portion of the probe excluding the opening at the front end is coated with a film of a metal such as nickel, chromium, gold, or other metal. The metal film coating the opening is removed by a etching process using a strong acid. Alternatively, during operation of the AFM, the contact pressure is increased to mechanically move the metal film.

In the embodiments described thus far, the probe uses an optical fiber. Another probe can be fabricated by forming a film of $LiTaO_3$, $LiNbO_3$, or glass on a hook-shaped resilient substrate and forming a light waveguide by doping.

Figure 15:
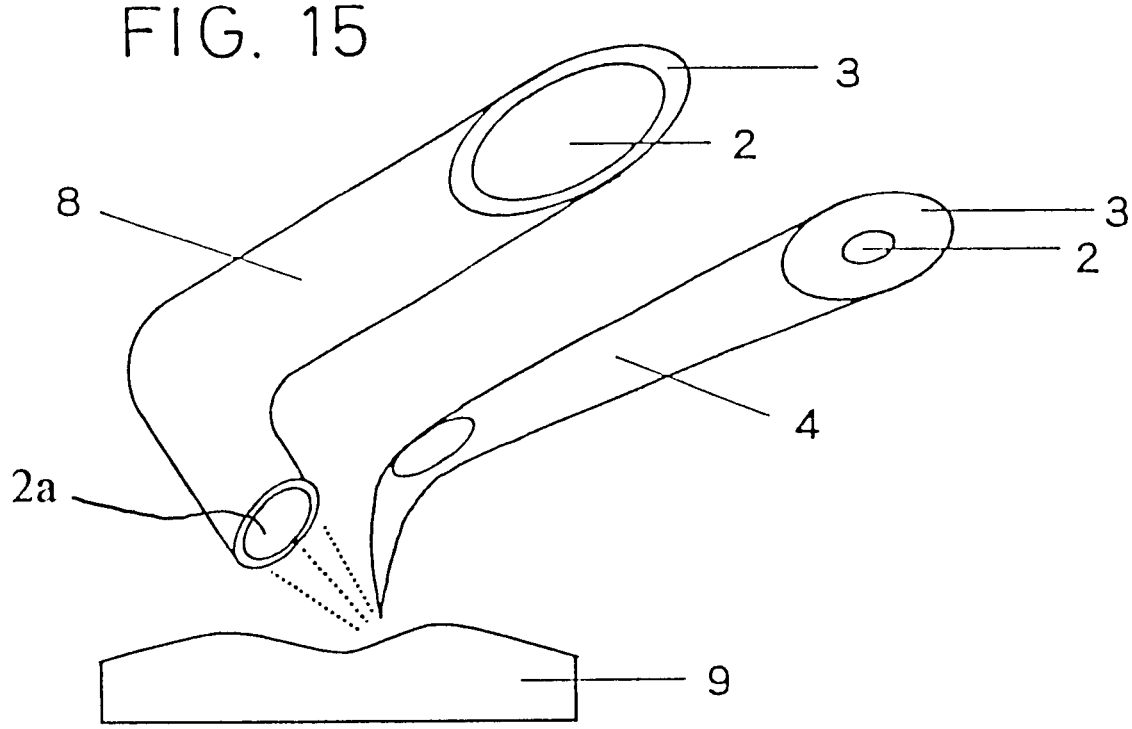
FIG. 15 is a schematic view showing the positional relation among two probes and a sample according to the invention.

FIG. 15 is a schematic view illustrating a case in which an auxiliary probe 8 is used together with a sharpened probe 4 to observe a sample 9. The auxiliary probe 8 is composed of an optical fiber having a core 2 that is a light-propagating body and a cladding 3, in the same way as the sharpened probe 4. The front end portion of the auxiliary probe 8 has a light-transmitting surface 2a.

An optical fiber having a core diameter of 10 $\mu$m and a cladding diameter of 125 $\mu$m is used as the auxiliary probe 8. The coating of synthetic resin is removed about 2 to 6 cm from the end of the optical fiber. The front end portion is cut by a fiber cleaver so as to form a plane. Then, light emitted by a carbon dioxide gas laser is focused onto this fiber at a position spaced 2 to 5 mm from the front end of the fiber. Let 0° be the angular position assumed before deformation. The deformation produces a hook-shaped portion of about 60 to 90°.

(Configuration of Apparatus)

Figure 16:
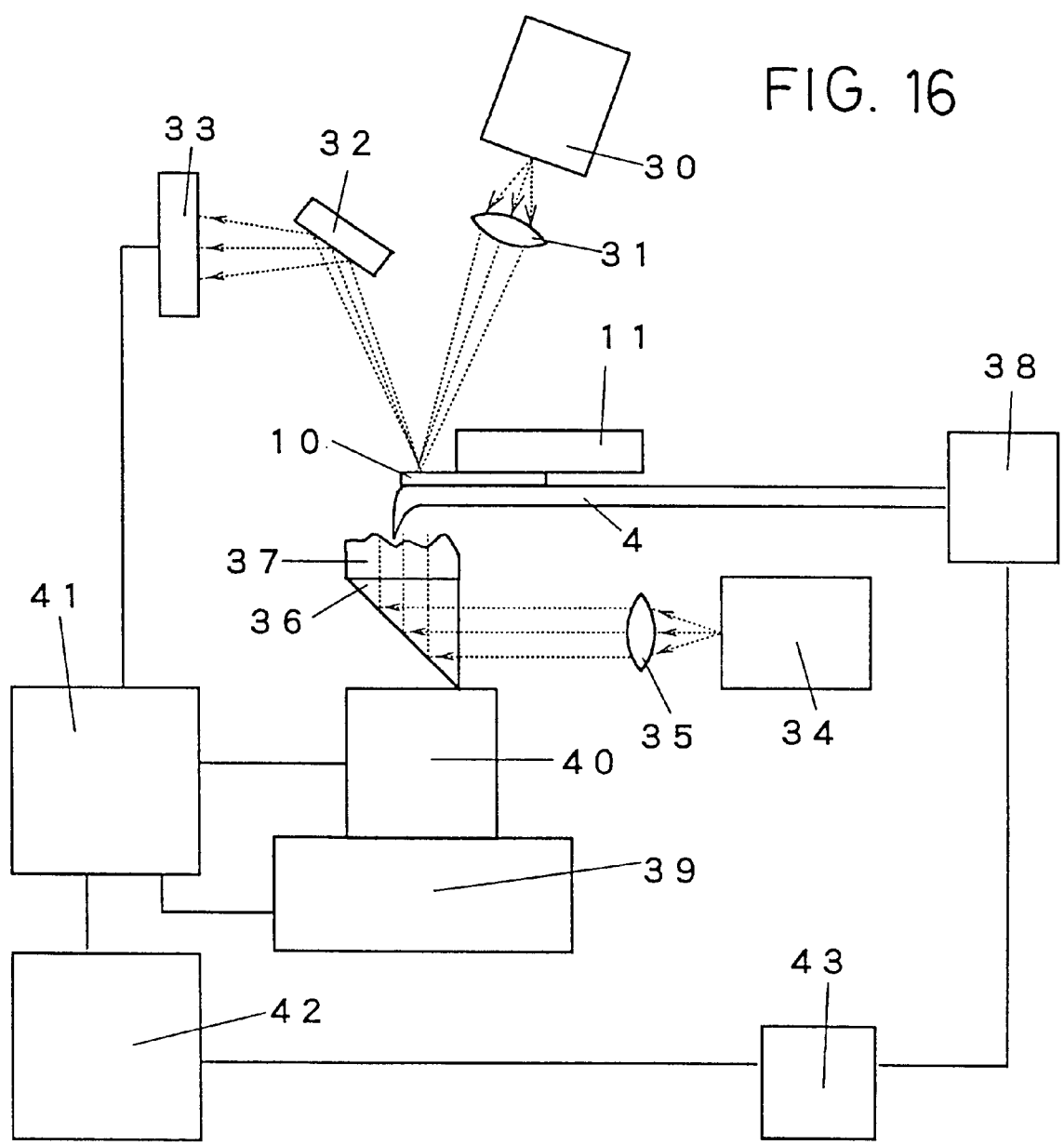
FIG. 16 is a schematic view of an apparatus according to the invention, and in which light is emitted from the rear side of a sample.

FIG. 16 is a schematic view of an apparatus for detecting light leaking from the rear side of a sample, showing one example of the structure of an apparatus according to the invention. In FIG. 16, a laser 30, a condenser lens 31, a mirror 32, and a photoelectric converter device 33 are installed above the probe 4 shown in FIG. 13 or 14. The converter device 33 is divided into an upper and a lower parts. Light emitted from the laser 30 is focused onto a spring element 10 by the condenser lens 31, the spring element 10 acting also as a reflecting sheet over the probe. Light reflected by the spring element is introduced into the photoelectric converter device 33 via the mirror 32. Light emitted by a light source 34 for measurements of optical information is caused to fall on a sample 37 from the rear side via a collimator lens 35, the sample being placed on a prism 36 whose inclined surface is so processed as to totally reflect its incident light. Light is introduced into the front end of the probe 4 close to the sample and transmitted to into the other end of the probe 4. Finally, the light is introduced into a photoelectric converter device 38.

The prism 36 and the sample 37 are installed on a coarse-motion mechanism 39 and a fine-motion mechanism 40 both of which can move in three dimensions. The output signal from the photoelectric converter device 33 is sent to a servomechanism 41. In response to this signal, the servomechanism 41 controls the coarse-motion mechanism 39 and the fine-motion mechanism 40 in such a way that the deflection of the probe does not exceed a given value when the probe is moved toward the sample or when surface is observed. A computer 42 is connected with the servomechanism 41 to control the operation of the fine-motion mechanism 40 in the horizontal direction and to take information about the surface topography from the signal controlling the servomechanism. If the light from the light source 34 is modulated, or if vibration is produced between the probe and the sample, the signal from the photoelectric converter device 38 is coupled to the analog input interface of the computer 42 via a lock-in amplifier 43. Thus, optical information is detected in synchronism with the two-dimensional operation of the fine-motion mechanism 40. If the light from the light source 34 is not modulated nor otherwise processed, then the signal from the photoelectric converter device 38 is coupled to the analog input interface of the computer 42 directly, i.e., without need of the lock-in amplifier 43.

Figure 17:
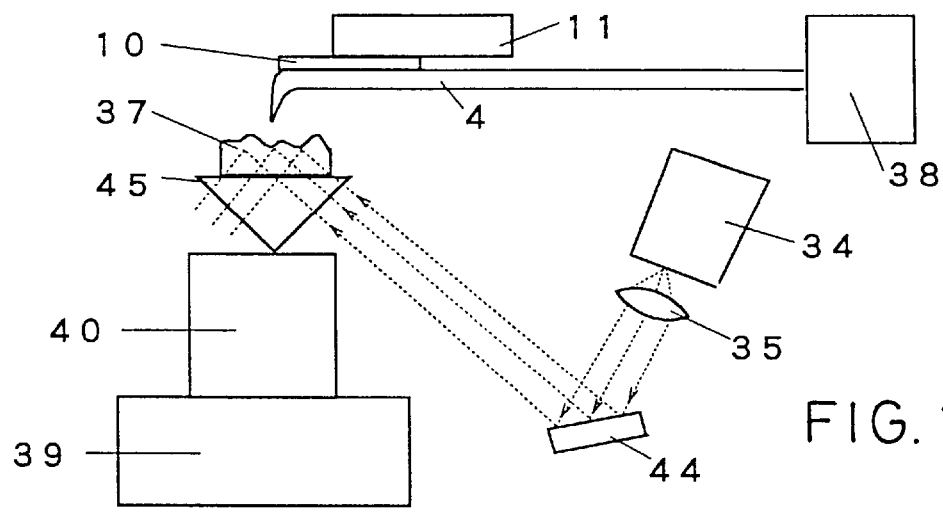
FIG. 17 is a schematic view of an apparatus according to the invention, and in which evanescent light is measured.

FIG. 17 is a schematic view of the optical system portion of one of the novel apparatuses which detects evanescent light. Light emitted by a light source 34 for measurements of optical information is directed at such an angle to a prism 45 via both a collimator lens 35 and a mirror 44 that the light falls on the prism 45 from a side and that the light is then totally reflected by the rear side of the sample. The sample 37 is placed on the prism 45 whose inclined surface is directed upward. At this time, evanescent light leaks from the sample surface and is introduced into the front end of the probe 4 close to the sample 37. Then, the light is guided to the other end and introduced into the photoelectric converter device 38. The prism 45 and the sample 37 are placed on the coarse-motion mechanism 39 and the fine-motion mechanism 40 which can move in three dimensions.

Figure 18:
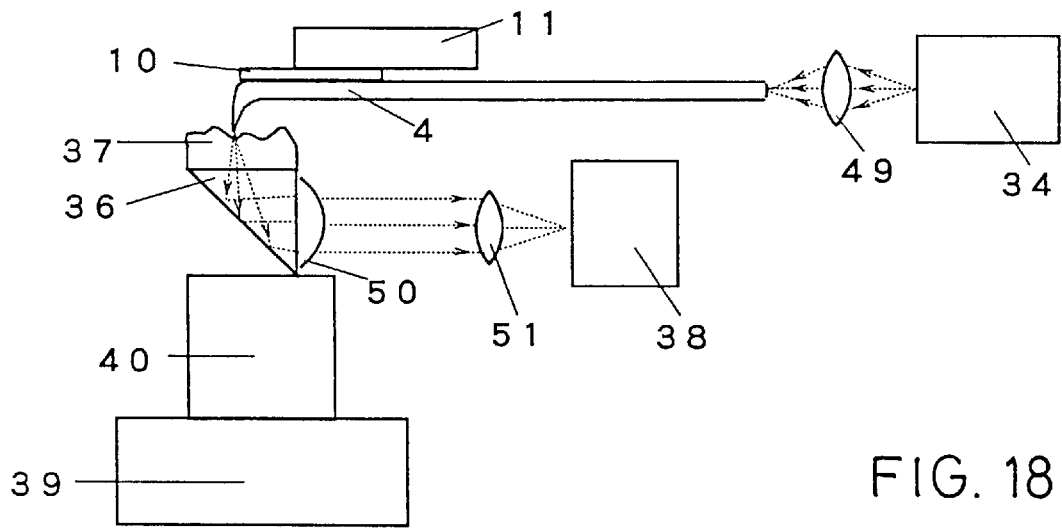
FIG. 18 is a schematic view of an apparatus according to the invention, and in which light is emitted by a probe and transmitted light is measured.

FIG. 18 is a schematic view of the optical system portion of one of the novel apparatuses which emits light from a probe 4 and detects transmitted light. Light emitted by a light source 34 for measurements of optical information is introduced into the probe 4 by a condenser lens 49 and directed to the surface of a sample 37 from the front end of the probe that is close to a prism 36. The inclined surface of this prism 36 is coated such that it totally reflects its incident light. The sample 37 is placed on the prism 36. Light reflected by the internal surface of the inclined surface of the prism 36 is collimated by a lens 50 and focused onto a photoelectric converter device 38 by a lens 51. The prism 36 and the sample 37 are placed on a coarse-motion mechanism 39 and a fine-motion mechanism 40 which are able to move in three dimensions.

Figure 19:
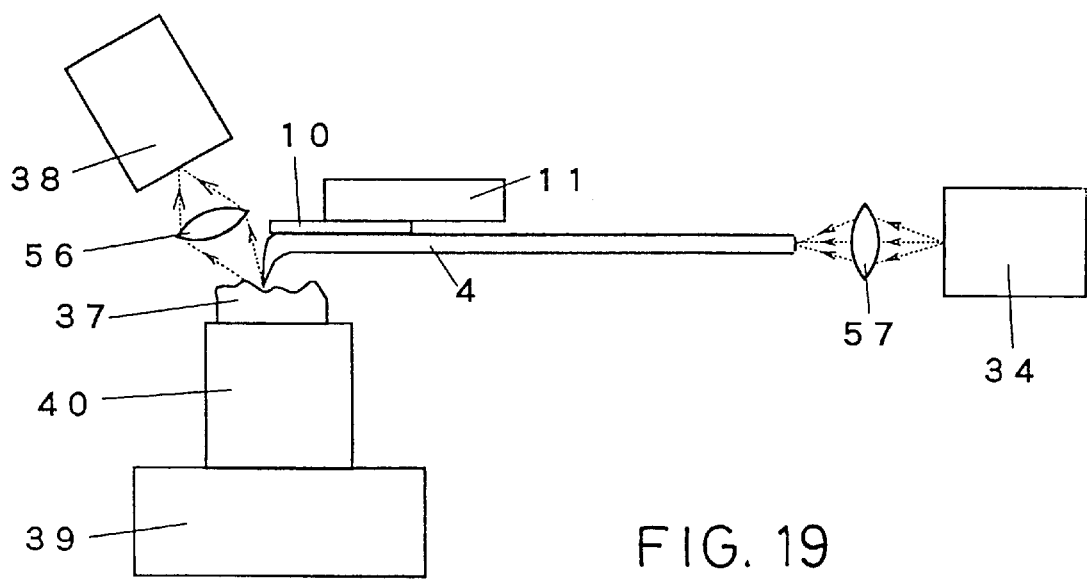
FIG. 19 is a schematic view of an apparatus according to the invention, and in which light is emitted by a probe and reflected light is measured.

FIG. 19 is a schematic view of one of the novel apparatuses which uses a probe on the light projector side and measures reflected light. Light emitted by a light source 34 is focused by a lens 57 and introduced into an optical fiber 4. The introduced light is then directed to the sample surface from the front end of the probe 4 that is close to the sample. Light reflected by the sample 37 is focused onto a photoelectric converter device 38 by a receiving lens 56 which is placed on the top surface of the sample. The sample 37 is placed on a coarse-motion mechanism 39 and a fine-motion mechanism 40 which are capable of moving in three dimensions.

Figure 20:
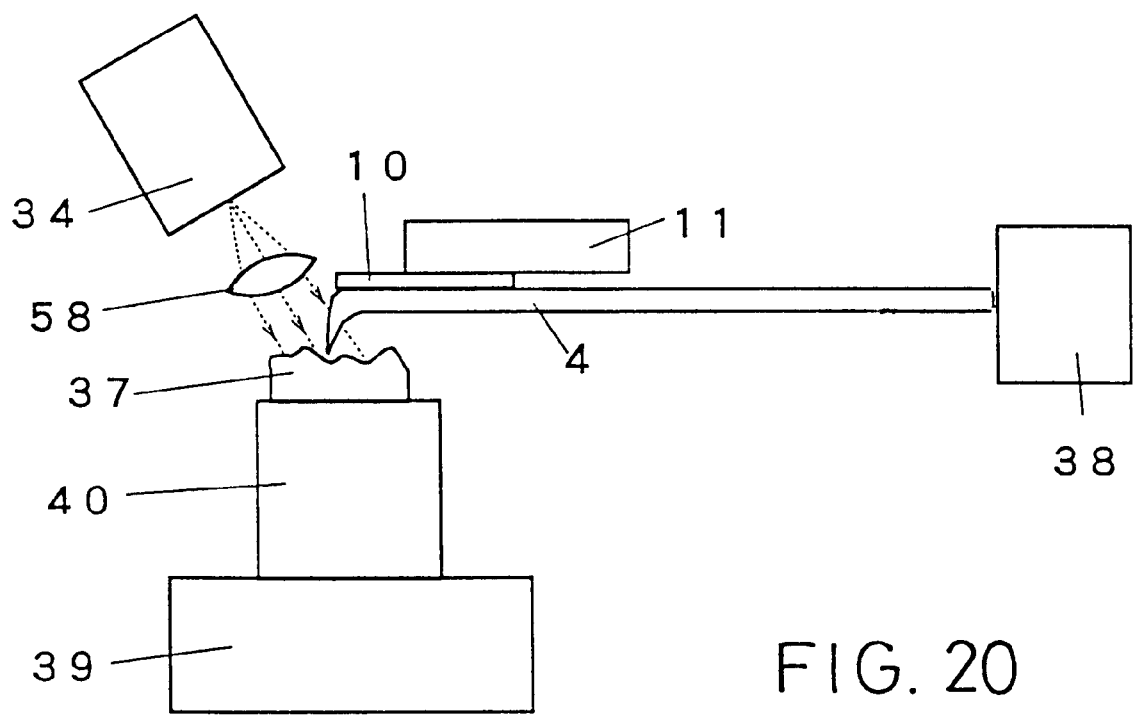
FIG. 20 is a schematic view of an apparatus according to the invention, and in which light reflected by a sample is detected by a probe.

FIG. 20 is a schematic view of one of the novel apparatuses which uses a probe on the light receiver side and measures reflected light. Light emitted by a light source 34 installed on the top surface of the sample is directed onto a sample 37 via a lens 58. Of the light reflected by the sample surface, light reflected around the front end of the probe 4 close to the sample surface is introduced into the optical fiber from the front end of the probe. Then, the light is directed onto the surface of the photoelectric converter device 38 from the end of the probe. The sample 37 is placed on a coarse-motion mechanism 39 and a fine-motion mechanism 40 which are capable of moving in three dimensions.

Figure 21:
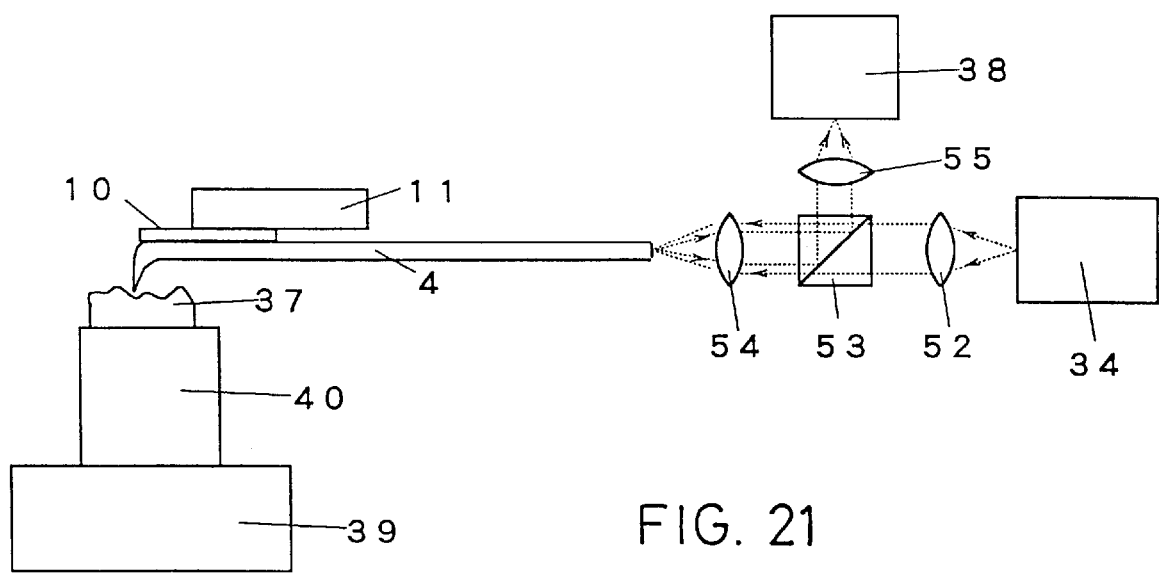
FIG. 21 is a schematic view of an apparatus according to the invention, and in which a probe emits light and detects reflected light.

FIG. 21 is a schematic view of one of the novel apparatuses which is of the reflected light measurement type, i.e., uses a probe for both projection and reception of light. Light emitted by a light source 34 is collimated by a lens 52 and transmitted through a beam splitter 53. Then, the light is focused by a lens 54 and introduced into the optical fiber 4. The introduced light is directed onto the sample surface from the front end of the probe 4 close to the sample 37. Light reflected by the sample 37 is again introduced into the probe 4 from the front end of the probe. Then, the light exits the end of the probe and is collimated by the lens 54. The component of the light which is reflected at an angle of 90° by the beam splitter 53 is focused onto the photoelectric converter device 38 by a lens 55. The sample 37 is placed on a coarse-motion mechanism 39 and a fine-motion mechanism 40 which are capable of moving in three dimensions.

Figure 22:
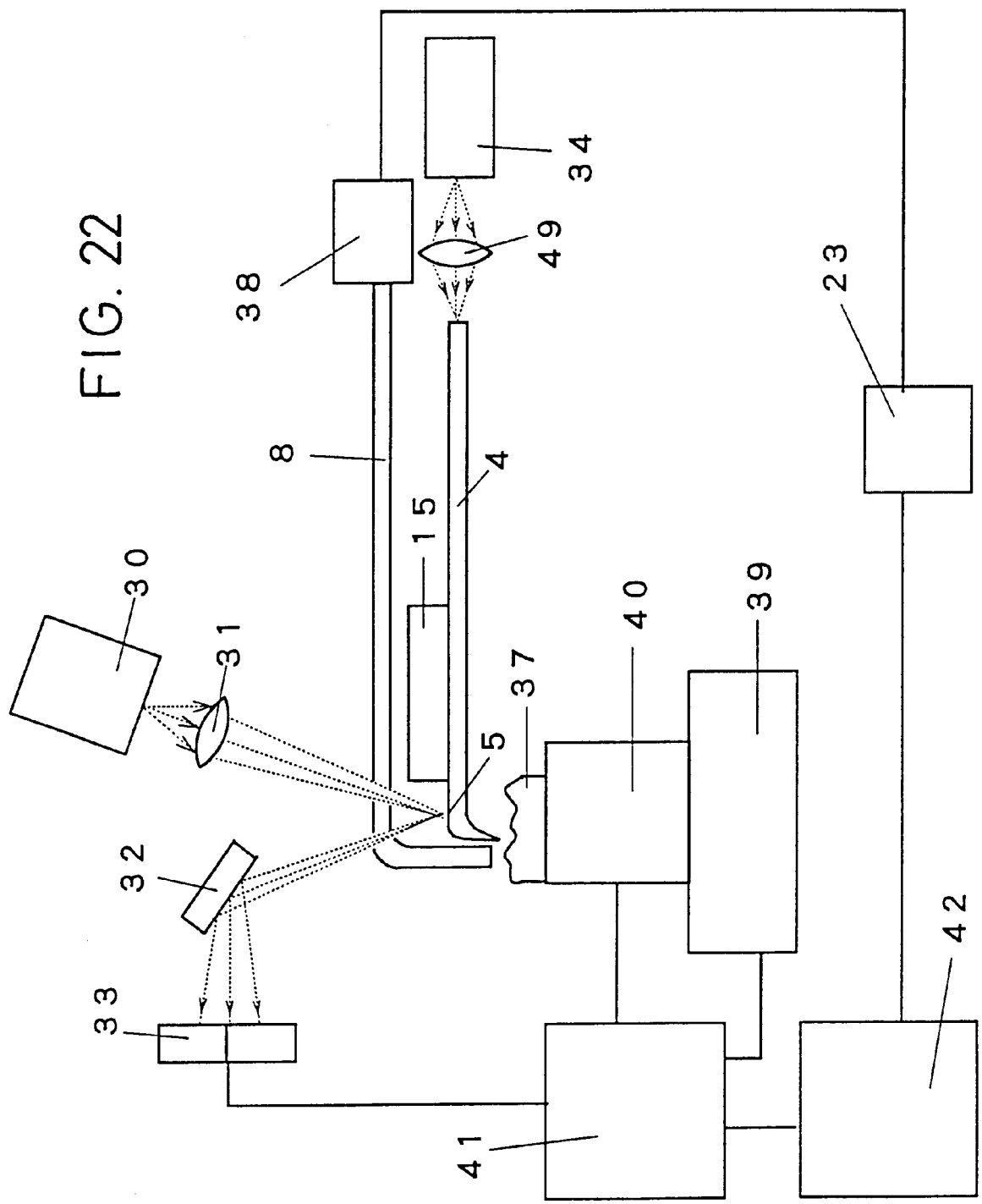
FIG. 22 is a schematic view of an apparatus according to the invention, and in which one probe emits light and another probe detects reflected light.

FIG. 22 is a schematic view of an apparatus which emits light from a sharpened probe 4 and detects light by an auxiliary probe 8, showing one example of the structure of an apparatus according to the invention. In FIG. 22, a laser 30, a condenser lens 31, a mirror 32, and a photoelectric converter device 33 are installed above the sharpened probe 4. The converter device 33 is divided into an upper and a lower parts. Light emitted by the laser 30 is focused onto the light-reflecting surface 5 of the sharpened probe 4 by the condenser lens 31. Light reflected by the light-reflecting surface 5 is introduced into the photoelectric converter device 33 via the mirror 32. The light emitted by the light source 34 is converged by a lens 49 and introduced into the core from the end opposite to the front end of the sharpened probe 4. The introduced light is directed onto the sample surface from the front end of the sharpened probe 4 that is close to the sample. Light reflected by the sample is guided into the photoelectric converter device 38 by the auxiliary probe 8 which is installed on the top surface of the sample. The sample 37 is placed on both a coarse-motion mechanism 39 and a fine-motion mechanism 40 which are capable of moving in three dimensions.

The output signal from the photoelectric converter device 33 is sent to the servomechanism 41. In response to this signal, the servomechanism 41 controls the coarse-motion mechanism 39 and the fine-motion mechanism 40 in such a way that the deflection of the probe does not exceed a given value when the probe is moved toward the sample or when the surface is observed. A computer 42 is connected with the servomechanism 41 to control the operation of the fine-motion mechanism 40 in the horizontal direction and to take information about the surface topography from the signal controlling the servomechanism. If the light from the light source 34 is modulated or vibration is produced between the probe and the sample, the signal from the photoelectric converter device 38 is coupled to the analog input interface of the computer 42 via a lock-in amplifier 43. Thus, optical information is detected in synchronism with the two-dimensional operation of the fine-motion mechanism 40. If the light from the light source 34 is not modulated nor otherwise processed, then the signal from the photoelectric converter device 38 is coupled to the analog input interface of the computer 42 directly, i.e., without passing through the lock-in amplifier 43.

If a piezoelectric device for vibrating the sharpened probe vertically relative to the sample is used to produce vertical vibrations between the probe and the sample, a piezoelectric body 15 expanding and contracting in the direction of the thickness when a voltage is applied is installed on the probe. Electrodes are mounted to both surfaces of the piezoelectric body 15. An AC power supply capable of applying an AC voltage of 0.1 to 10 V at 1 to 100 kHz is connected between the electrodes.

If the apparatus is configured where the auxiliary probe 8 emits light and the sharpened probe 4 detects light, the light source 34 and the lens 49 are installed on the opposite side of the auxiliary probe 8. The photoelectric converter device 38 is installed on the opposite side of the sharpened probe 4.

In the apparatuses described thus far, a photomultiplier, a photodiode, a photodiode array, or a CCD image sensor can be used as the photoelectric converter device 38. If necessary, an optical filter, a grating, or other spectral dispersion device is installed in front of the photoelectric converter device 38, whereby information about wavelengths can be observed. The light source 34 can consist of a semiconductor laser, a He-Ne laser, an Ar laser, a nitrogen laser, a YAG laser, other laser, or a combination of a conventional white light source and a monochromator. Where the detected light is quite weak as encountered where evanescent light is measured, it is necessary that the light emitted by the light source be modulated and that the synchronized component be taken from the detector output to remove noise. In the case of a semiconductor laser, electrical current flowing through the laser element can be controlled by pulses to modulate the light.

Where other light sources are used, the light can be modulated by the use of a mechanical light chopper, an EO modulator (electrooptical modulator), or an AO modulator (acoustooptic modulator). Where vibrations are produced between the probe and the sample, these vibrations produce the same effect as modulation. A piezoelectric ceramic cylinder having a length of 100 mm, an outside diameter of 10 mm, and a wall thickness of 1 mm is used as the fine-motion mechanism 40. This fine-motion mechanism moves 150 μm in X- and Y-directions and 5 μm in the Z-direction. The means for producing vibrations between the probe and the sample is not limited to the means shown in FIG. 14. The vibrations can also be produced by Z-direction motion of the fine-motion mechanism 40. A bimorph cell for vibrating the sample in the Z-direction can be added to the fine-motion mechanism 40.

Where light is emitted from the auxiliary probe, the spot of light can be reduced by polishing the end surface of the auxiliary probe so as to make the surface convex.

In the apparatus built in this way, where transmitted light was measured, two-dimensional information about transmittance, absorbance, and fluorescent light could be measured simultaneously with observation of an AFM image. Where reflected light was measured, we discovered that the apparatus was suited for measurements of the transmittance, absorbance of the sample surface and of fluorescent light from the surface. Resolutions of 10 nm could be achieved in obtaining an AFM image and two-dimensional optical information.

In the present embodiment of the novel apparatus, the probe is fixed, and the operating means is mounted on the side of the sample. It is also possible to build an apparatus in which an operating means is mounted on the side of the probe, and in which a sample is fixed.

The inventive probe and apparatus can realize an apparatus capable of measuring the topography and the optical characteristics of a sample surface at high resolution, irrespective of the transmittance and the conductivity of the sample.

Especially, where the resilience of a sharpened probe itself is used as a spring element and a light-reflecting surface is formed directly on the probe, an accurate probe which is easy to fabricate can be obtained.

The probe having the thin resilient film bonded to the rear side of the hook-shaped portion suppresses the effects of the rigidity of the light-propagating body by spacing the support points of the light-propagating body a great distance from the support points of the resilient film. A displacement depending on the resilience of the thin resilient film can be obtained. Also, the resilience can be set easily. A probe excellent in reproducibility can be provided.

In addition, an apparatus capable of measuring not only the topography and the optical characteristics of the surface of a sample but also scattered light and fluorescent light can be accomplished by using an auxiliary probe along with a sharpened probe.

What is claimed is:

1. A scanning near-field optic/atomic force microscope for observing topography and optical characteristics of a surface of a sample, the microscope comprising:

a sharpened probe having a hook-shaped front end portion provided with an optical hole for passing light at a sharpened end thereof and having light-reflecting means on a part thereof for reflecting light;

a light source and optics for irradiating the sample with light;

a photoelectric converter and optics for receiving at least one of a light transmitted through the sample or a light reflected by the sample;

a laser source for producing laser light for detecting deflections of the sharpened probe;

a condenser lens for directing the laser light to the light-reflecting means on the sharpened probe;

detecting means for detecting light reflected from the light-reflecting means;

moving means for effecting relative movement between the sample and the sharpened probe;

control means for controlling a distance between the surface of the sample and a front end of the sharpened probe; and means for vertically vibrating the front end of the sharpened probe and the sample relative to each other.

2. A scanning near-field optic/atomic force microscope for observing topography and optical characteristics of a surface of a sample, the microscope comprising:

a sharpened probe having a hook-shaped front end portion provided with an optical hole for passing light at a sharpened end thereof and having light-reflecting means on a part thereof for reflecting light;

a light source and optics for irradiating the sample with light;

a photoelectric converter and optics for receiving at least one of a light transmitted through the sample or a light reflected by the sample;

a laser source for producing laser light for detecting deflections of the sharpened probe;

a condenser lens for directing the laser light to the light-reflecting means on the sharpened probe;

detecting means for detecting light reflected from the light-reflecting means;

moving means for effecting relative movement between the sample and the sharpened probe;

control means for controlling a distance between the surface of the sample and a front end of the sharpened probe; and an auxiliary probe comprised of a light-propagating body having an end portion provided with a hole for passing light, the auxiliary probe having a light-passing hole portion and a light-transmitting surface which is disposed close to the front end portion of the sharpened probe.

3. A scanning near-field optic/atomic force microscope according to claim 2; wherein the light-passing hole portion of the auxiliary probe is formed in a convex surface.

4. A scanning near-field optic/atomic force microscope for observing topography and optical characteristics of a surface of a sample, the microscope comprising:

a sharpened probe having a hook-shaped front end portion provided with an optical hole for passing light at a sharpened end thereof and having light-reflecting means on a part thereof for reflecting light, the sharpened probe being bonded to a spring element at a back side of the sharpened probe as viewed from the hook-shaped front end portion;

a light source and optics for irradiating the sample with light;

a photoelectric converter and optics for receiving at least one of a light transmitted through the sample or a light reflected by the sample;

a laser source for producing laser light for detecting deflections of the sharpened probe;

a condenser lens for directing the laser light to the light-reflecting means on the sharpened probe;

detecting means for detecting light reflected from the light-reflecting means;

moving means for effecting relative movement between the sample and the sharpened probe; and control means for controlling a distance between the surface of the sample and a front end of the sharpened probe.

5. A scanning near-field optic/atomic force microscope according to claim 4; wherein the spring element is joined to a support member, and the sharpened probe is bonded to the support member, and wherein a distance from a bonded point of the support member and the sharpened probe to a joined point of the support member and the spring element is longer than a distance from the joined point of the support member and the spring element to the sharpened end of the sharpened probe.

6. A scanning near-field optic/atomic force microscope according to claim 4; wherein the spring element has a light-reflecting surface for detecting a deflection of the sharpened probe.

7. A scanning near-field optic/atomic force microscope for observing topography and optical characteristics of a surface of a sample, the microscope comprising:

a sharpened probe having an optical hole defining a light passage which is free of a light reflective mirror for passing light at a sharpened front end thereof and having light-reflecting means on an external part thereof for reflecting light;

a light source and optics for irradiating the sample with light;

a photoelectric converter and optics for receiving at least one of a light transmitted throuah the sample or a light reflected by the sample;

a laser source for producing laser light for detecting deflections of the sharpened probe;

a condenser lens for directing the laser light to the light-reflecting means on the sharpened probe;

detecting means for detecting light reflected from the light-reflecting means;

moving means for effecting relative movement between the sample and the sharpened probe;

control means for controlling a distance between the surface of the sample and a front end of the sharpened probe; and means for vertically vibrating the front end of the sharpened probe and the sample relative to each other.

8. A scanning near-field optic/atomic force microscope for observing topography and optical characteristics of a surface of a sample, the microscope comprising:

a sharpened probe having an optical hole defining a light passage which is free of a light reflective mirror for passing light at a sharpened front end thereof and having light-reflecting means on an external part thereof for reflecting light;

a light source and optics for irradiating the sample with light;

a photoelectric converter and optics for receiving at least one of a light transmitted through the sample or a light reflected by the sample;

a laser source for producing laser light for detecting deflections of the sharpened probe;

a condenser lens for directing the laser light to the light-reflecting means on the sharpened probe;

detecting means for detecting light reflected from the light-reflecting means;

moving means for effecting relative movement between the sample and the sharpened probe;

control means for controlling a distance between the surface of the sample and a front end of the sharpened probe; and an auxiliary probe comprised of a light-propagating body having an end portion provided with a hole for passing light, the auxiliary probe having a light-passing hole portion and a light-transmitting surface which is disposed close to the front end portion of the sharpened probe.

9. A scanning near-field optic/atomic force microscope according to claim 8; wherein the light-passing hole portion of the auxiliary probe is formed in a convex surface.

10. A scanning near-field optic/atomic force microscope for observing topography and optical characteristics of a surface of a sample, the microscope comprising:

a sharpened probe having an optical hole defining a light passage which is free of a light reflective mirror for passing light at a sharpened front end thereof and having light-reflecting means on an external part thereof for reflecting light, the sharpened probe being bonded to a spring element at a back side of the sharpened probe as viewed from the front end of the probe;

a light source and optics for irradiating the sample with light;

a photoelectric converter and optics for receiving at least one of a light transmitted through the sample or a light reflected by the sample;

a laser source for producing laser light for detecting deflections of the sharpened probe;

a condenser lens for directing the laser light to the light-reflecting means on the sharpened probe;

detecting means for detecting light reflected from the light-reflecting means;

moving means for effecting relative movement between the sample and the sharpened probe; and control means for controlling a distance between the surface of the sample and a front end of the sharpened probe.

11. A scanning near-field optic/atomic force microscope according to claim 10; wherein the spring element is joined to a support member, and the sharpened probe is bonded to the support member, and wherein a distance from a bonded point of the support member and the sharpened probe to a joined point of the support member and the spring element is longer than a distance from the joined point of the support member and the spring element to the sharpened end of the sharpened probe.

12. A scanning near-field optic/atomic force microscope according to claim 10; wherein the spring element has a light-reflecting surface for detecting a deflection of the sharpened probe.

13. A scanning near-field optic/atomic force microscope for observing topography and optical characteristics of a surface of a sample, the microscope comprising:

sharpened probe means having an optical hole for passing light at a sharpened front end thereof and having light-reflecting means on an external part thereof for reflecting light;

a light source and optics for irradiating the sample with light;

a photoelectric converter and optics for receiving at least one of a light transmitted through the sample or a light reflected by the sample;

a laser source for producing laser light for detecting deflections of the sharpened probe means;

a condenser lens for directing the laser light to the light-reflecting means on the sharpened probe means;

detecting means for detecting light reflected from the light-reflecting means;

moving means for effecting relative movement between the sample and the sharpened probe means;

control means for controlling a distance between the surface of the sample and a front end of the sharpened probe means; and means for vertically vibrating the front end of the sharpened probe means and the sample relative to each other.

14. A scanning near-field optic/atomic force microscope for observing topography and optical characteristics of a surface of a sample, the microscope comprising:

sharpened probe means having an optical hole for passing light at a sharpened front end thereof and having light-reflecting means on an external part thereof for reflecting light;

a light source and optics for irradiating the sample with light;

a photoelectric converter and optics for receiving at least one of a light transmitted through the sample or a light reflected by the sample;

a laser source for producing laser light for detecting deflections of the sharpened probe means;

a condenser lens for directing the laser light to the light-reflecting means on the sharpened probe means;

detecting means for detecting light reflected from the light-reflecting means;

moving means for effecting relative movement between the sample and the sharpened probe means;

control means for controlling a distance between the surface of the sample and a front end of the sharpened probe means; and an auxiliary probe comprised of a light-propagating body having an end portion provided with a hole for passing light, the auxiliary probe having a light-passing hole portion and a light-transmitting surface which is disposed close to the front end portion of the sharpened probe means.

15. A scanning near-field optic/atomic force microscope according to claim 14; wherein the light-passing hole portion of the auxiliary probe is formed in a convex surface.

16. A scanning near-field optic/atomic force microscope for observing topography and optical characteristics of a surface of a sample, the microscope comprising:

sharpened probe means having an optical hole for passing light at a sharpened front end thereof and having light-reflecting means on an external part thereof for reflecting light, the sharpened probe means being bonded to a spring element at a back side of the sharpened probe means as viewed from the front end of the sharpened probe means;

a light source and optics for irradiating the sample with light;

a photoelectric converter and optics for receiving at least one of a light transmitted through the sample or a light reflected by the sample;

a laser source for producing laser light for detecting deflections of the sharpened probe means;

a condenser lens for directing the laser light to the light-reflecting means on the sharpened probe means;

detecting means for detecting light reflected from the light-reflecting means;

moving means for effecting relative movement between the sample and the sharpened probe means; and control means for controlling a distance between the surface of the sample and a front end of the sharpened probe means.

17. A scanning near-field optic/atomic force microscope according to claim 16; wherein the spring element is joined to a support member, and the sharpened probe means is bonded to the support member, and wherein a distance from a bonded point of the support member and the sharpened probe means to a joined point of the support member and the spring element is longer than a distance from the joined point of the support member and the spring element to the sharpened end of the sharpened probe means.

18. A scanning near-field optic/atomic force microscope according to claim 16; wherein the spring element has a light-reflecting surface for detecting a deflection of the sharpened probe means.

* * * * *